March 10, 1931.  W. D. FRICKE  1,796,016
AIRPLANE WING
Filed Jan. 22, 1930   2 Sheets-Sheet 1
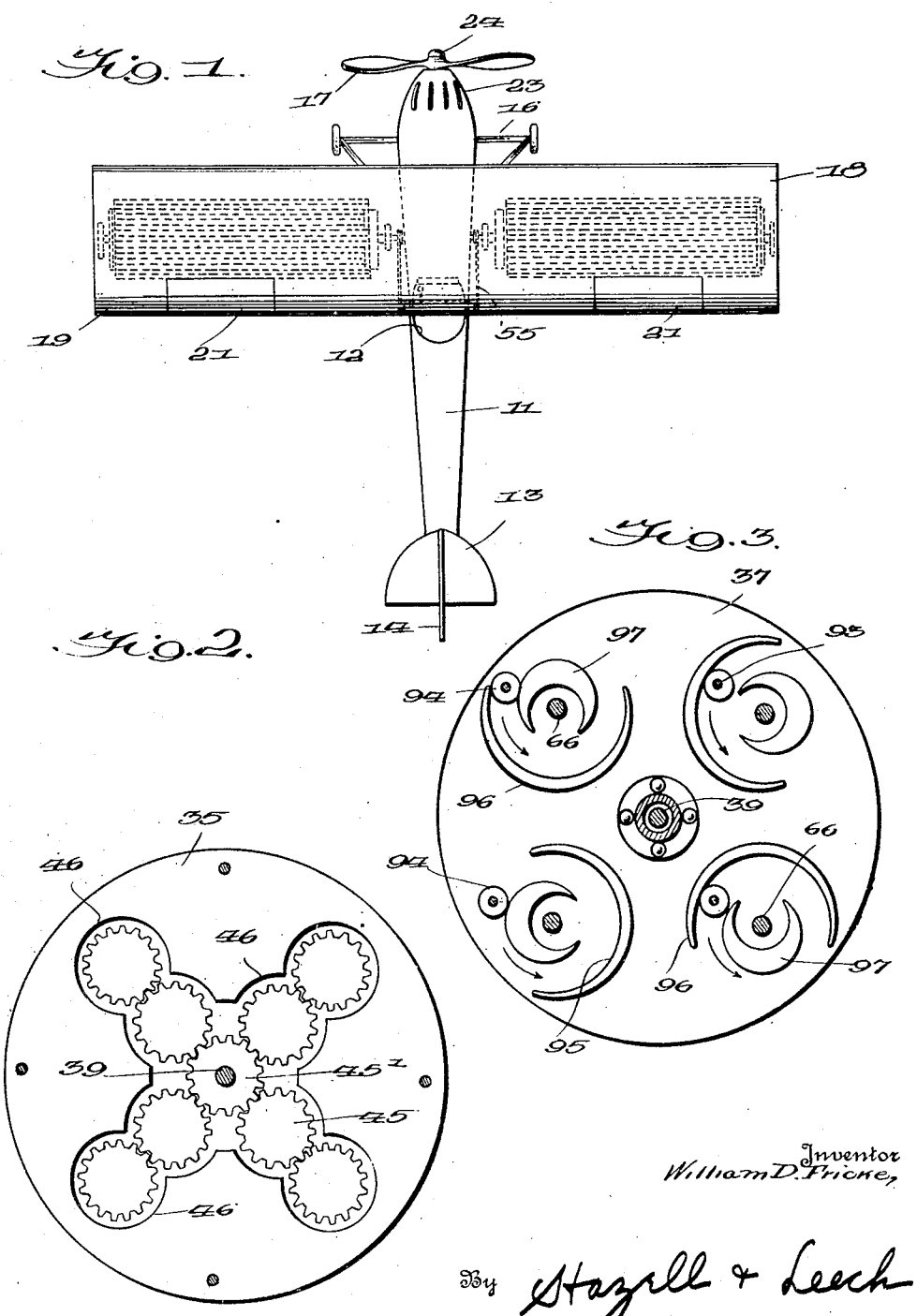

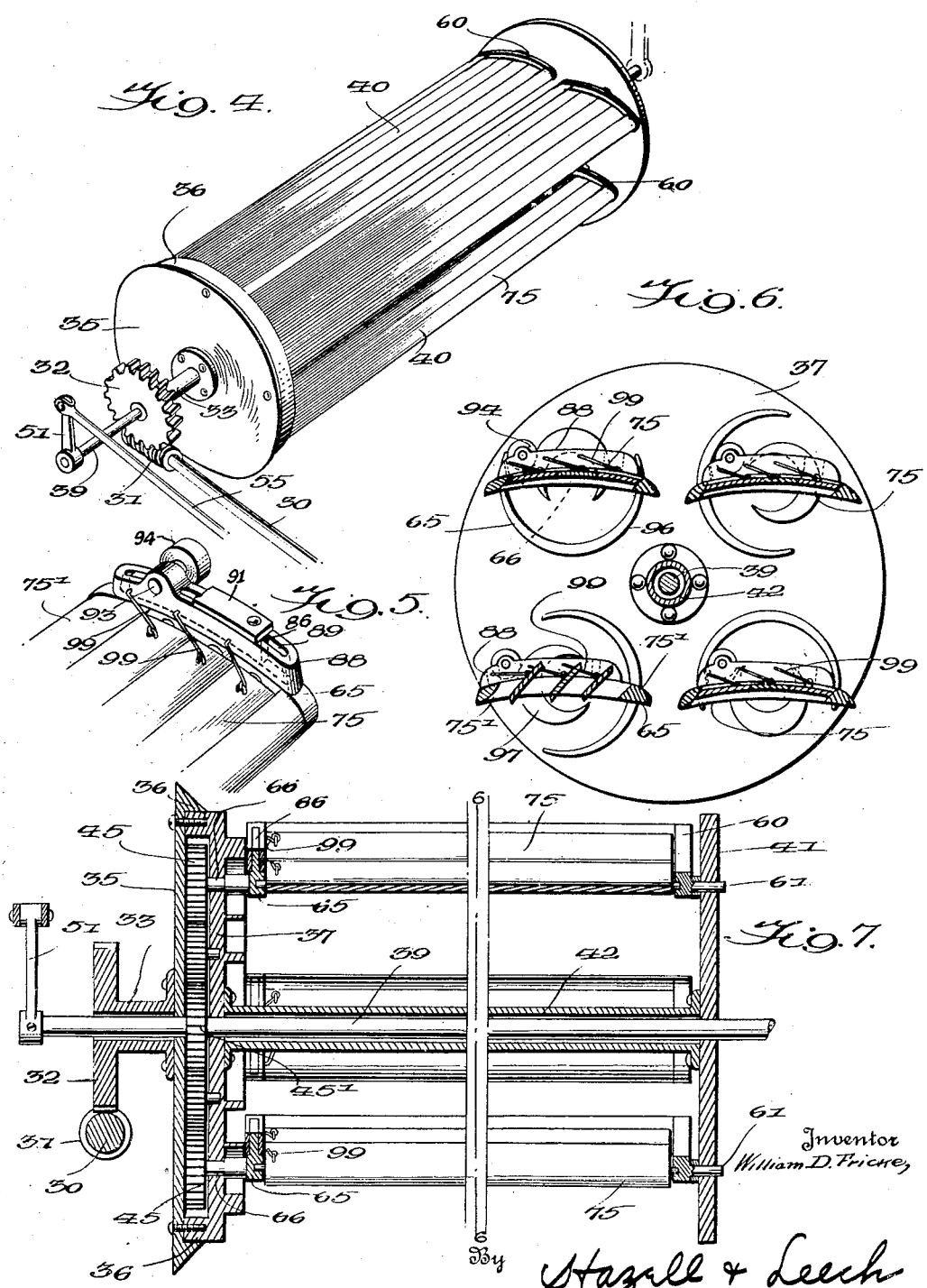

Patented Mar. 10, 1931

1,796,016

UNITED STATES PATENT OFFICE

WILLIAM DAVID FRICKE, OF LE ROY, ILLINOIS

AIRPLANE WING

Application filed January 22, 1930. Serial No. 422,632.

The present invention relates to airplanes, and more particularly to auxiliary resistance and lifting devices therefor.

The invention comprises an auxiliary rotary wing structure to be used adjacent to or in lifting cooperation with the usual or substantially stationary main wings.

An object of the invention is to provide an auxiliary lifting and resistance mechanism which is rotatable, when desired, for the purpose of exerting a lifting action on an airplane or dirigible, and which can, in addition, be used either as a stationary auxiliary wing or as a stationary air resistance medium for bringing a plane quickly to a stop upon landing.

Other objects and advantages of the invention will appear from the following description taken in connection with the accompanying drawings, which illustrate, by way of example, a preferred embodiment of the invention, and in which:

Fig. 1 is a top plan view of a conventional monoplane equipped with a pair of rotary auxiliary wings constructed in accordance with the present invention;

Fig. 2 is a face elevation, on an enlarged scale, of one of the cooperating rotary end disks of one series of auxiliary wings;

Fig. 3 is an exterior face elevation of the cooperating cam-carrying disks;

Fig. 4 is a perspective view of one auxiliary wing series structure;

Fig. 5 is a perspective view, on an enlarged scale, showing the cam-operated mechanism for opening and closing the wing sections of one wing of the series;

Fig. 6 is a sectional view taken on the line 6–6 of Fig. 7 radially through an entire series, and Fig. 7 is an axial sectional view through a single auxiliary wing series.

Referring in detail to the accompanying drawings and particularly to Fig. 1, a conventional monoplane is illustrated having a fuselage 11, cockpit 12, elevating and steering rudders 13 and 14 respectively, landing gear 16, propeller 17 and wings 18 and 19 each provided with a wing elevator 21. A motor enclosed in the forward end 23 of the fuselage is porvided with a crank shaft 24, which drives the propeller 17, and also for each auxiliary wing series, a shaft 30 (Figs. 4 and 7). Each shaft 30 is provided with a worm 31 meshing with a worm gear 32 fixed or formed on a sleeve 33 secured to the inner end disk 35. Secured to the end disk 35 by an annular flange 36 is a gear disk 37. The disks 35 and 37 are provided with center openings through which passes a control shaft 39, hereinafter more fully described. A series of auxiliary wing structures 40 are located between the gear disk 37 and an outer end disk 41, into the center of which the shaft 39 extends. The disks 35, 37 and 41 are rotatably mounted on the shaft 39, and disk 41 is connected to move with disk 37 by a sleeve 42 surrounding the shaft 39. It will be seen that with the foregoing construction, rotation of the motor-driven shaft 30 will, through worm 31 and worm gear 32, cause rotation as a unit of sleeve 33, end disk 35, gear disk 37, sleeve 42 and outer end disk 41.

In the space between disks 35 and 37 formed by annular flange 36 are located a plurality of control gears 45 mounted in housings 46 (Fig. 2) formed in the inner face of either of the disks 35 or 37 and herein shown as being formed in disk 35. The center disk 45′ is fast on control shaft 39 and at its inner end the control shaft 49 is provided with a lever arm 51, whose outer end is pivotally attached to a control rod 55, whose movement in the direction of its length will therefore cause partial rotation of the control shaft 39 and gears 45′ and 45 for a purpose presently to be described.

A plurality of wing-carrying plates 60 are provided with centrally located horizontally extending pivots 61 rotatably mounted in the outer end disk 41, as shown in Fig. 7, and a cooperating series of wing-carrying plates 65 having centrally located horizontally extending pivots 66 are rotatably mounted in the face of disk 37, as shown in Figs. 6 and 7. The plates 60 and 65 are the same in number and are arranged opposite each other so that each pair of plates 60 and 65 may pivotally carry a series of pivoted wing strips 75 provided with pivot pins at each end rotatably mounted in the plates 60 and 65, the series of pivoted wing strips being so proportioned as to width and location with respect to each other that when they lie substantially horizontal they overlap, as shown in Fig. 5, but when rotated about their pivot pins in the plates 60 and 65, they will lie spaced apart and substantially parallel to each other. The forward and rear wing strips 75' of each wing structure are fixed in the plates 60 and 65 so that they do not rotate with respect to said plates.

It will be understood that each auxiliary wing structure, such as that shown in Fig. 4, may consist of any desired number of auxiliary wings, four being shown in the present instance (see Figs. 4 and 6). Each of the series of the auxiliary wing structures has its pivot pin 66 secured to one of the radially outermost gears 45 (see Fig. 7) so that when the control shaft 39 with its gear 45' are held stationary and the motor-driven saft 30 is revolved to drive the worm gear 32, sleeve 42 and disks 35, 37 and 41, each auxiliary wing structure, while its pivot pins 61 and 66 rotate in a circular path, will nevertheless remain as a whole, horizontal, due to the fact that the center gear 45' remains stationary, whereas intermediate gear 45 will rotate around it, causing a compensating rotation to be given to end gear 45, as is evident from Fig. 2.

Where it is desired that the wing structures of each series be elevated more or less, or even, and as a whole, into vertical or substantially vertical position either for an additional lift or for offering resistance to bring the plane to a stop quickly upon landing, movement of the control rod 55 in its own direction will cause the desired amount of rotation of control shaft 39, which carries with it center gear 45', and through gears 45 alters the elevation of each of the auxiliary wing structures in the series by a like amount.

The invention provides mechanism in connection with each auxiliary wing structure of each series for decreasing its resistance to upward movement while it is moving upwardly with respect to sleeve 42 and for increasing its resistance to vertical movement while it is moving downwardly with respect to the sleeve 42. Thus, referring to Fig. 6, assuming the disk 37 and sleeve 47 are rotating in a clockwise direction and carrying with them the auxiliary wing structures of the series shown while the wing structures as a whole will remain horizontal during this rotation, unless the control rod 55 is shifted, each wing of the series will, by the mechanism now to be described, open on upward movement and close on downward movement.

For this purpose, the plate 65 is provided with a vertical flange 86 extending upwardly from the plate in the direction of its length, and surrounding the flange 86 in slidable relation therewith is the slide 88 provided with an opening 89 somewhat longer than the flange 86 and in which said flange fits for sliding movement. A retaining plate 91 is secured to the top of the flange 86 and prevents vertical movement of the slide 88 with respect to the flange. The slide 88 is fitted with a horizontal bearing in which is rotatably mounted a pin 93 carrying at its outer end a roller 94 (Figs. 3, 5 and 6). Each roller 94 projects into a cam track 95 and is acted on in turn by the inner track of cam 96 and the outer track of cam 97, both cams being fixed on the wing side of disk 37.

Referring to Fig. 3, it will be seen that the cams 96 and 97 are so arranged that as the disk 37 rotates and the auxiliary wings of the series remain horizontal, the cam 97 forces the roller 94 further away from the pivot pin 66 on upward movement of the wing structure, and the cam 96, upon downward movement of the auxiliary wing structure, forces the roller 94 nearer to the pivot pin 66. The slide 88, which carries the roller 94, necessarily follows these movements of the roller, and the individually pivoted movable wing strips 75 are connected by links 99 to the slide 88, the links 99 being fastened to the strips 75 on the far side of their individual pivot pins with respect to those ends of the links 99 which are secured to slide 88.

Thus, upon upward movement of an auxiliary wing of the series, the roller 94 is forced away from pivot pin 66 by means of cam 97 and carries with it slide 88, which, by means of links 99, moves the wing strips 75 about their pivots into substantially vertical spaced apart parallel relation, as indicated in Fig. 6, the assumption being that the disk 37 in Fig. 6 is rotating clockwise. As the individual wing structure of the series reaches the highest point in its circular path, the roller 94 is forced by cam 96 nearer to pivot pin 66, and through slide 88 and links 96 forces the individual wing strips 75 to closed or substantially horizontal position, there being a slight overlapping of the wing strips to form a substantially solid auxiliary wing of the series.

The operation of the invention in practice will be readily understood from the foregoing description. Where it is desired to use the auxiliary wings as an air resistance to bring the plane more quickly to a stop upon landing, their rotation may be either stopped or continued, as desired, but in either case the control rod 55 is moved in the direction of its length, and by means of gears 45 and 45' alters the elevation of all the individual wing structures in the series, tilting their forward ends upwardly so that they can, if desired, be brought to vertical or substantially vertical position.

Various changes may be made in the detailed construction above described by way of illustration without departing from the invention as defined by the following claims.

What is claimed is:

1. In an airplane, a series of pivoted wings movable in a circular path about a substantially horizontal axis, each of said wings having pivoted wing sections, a slide connected to the pivoted wing sections of each wing of the series, and control means for shifting said slide to vary the elevation of said pivoted wing sections in accordance with their position in their circular path of travel.

2. In an airplane, a series of pivoted wings movable in a circular path of travel about a substantially horizontal axis, each of said wings having pivoted wing sections, a slide connected to the pivoted wing sections of each wing, said slide carrying a roller, and rotatable cams for each roller to vary the position of its slide, thereby varying the elevation of said pivoted wing sections in accordance with their positions in their circular path of travel.

3. In an airplane, a series of pivoted auxiliary wings, means for moving each wing in a circular path about a substantially horizontal axis, gearing including a relatively stationary gear and movable gears cooperating therewith for maintaining a predetermined elevation of each wing of said series during its movement in said circular path, each of said wings having pivoted wing sections, a slide connected to the pivoted wing sections of each wing of the series, and control means for shifting said slide to vary the elevation of said pivoted wing sections in accordance with their position in said circular path of travel.

4. In an airplane, a series of pivoted auxiliary wings, means for moving said wings in a circular path about a substantially horizontal axis, gearing including a relatively stationary gear and movable gears cooperating therewith for maintaining desired elevation of each wing of said series during its circular movement, a control device for setting said relatively stationary gear in desired position for regulating the elevation of said wings, each of said wings having pivoted wing sections, a slide connected to the pivoted wing sections of each wing, said slide carrying a roller, and rotatable cams for each roller to vary the position of its slide, thereby varying the elevation of said pivoted wing sections in accordance with their positions in their said circular path of travel.

In testimony whereof I affix my signature.

WILLIAM DAVID FRICKE.